(12) United States Patent
Marcato

(10) Patent No.: US 7,238,017 B2
(45) Date of Patent: Jul. 3, 2007

(54) DOMESTIC PASTA MACHINE

(75) Inventor: Pietro Marcato, Campodarsego (IT)

(73) Assignee: Marcato S.p.A., Campodarsego PD (IT)

( * ) Notice: Subject to any disclaimer, the term of this patent is extended or adjusted under 35 U.S.C. 154(b) by 107 days.

(21) Appl. No.: 11/118,834

(22) Filed: Apr. 29, 2005

(65) Prior Publication Data

US 2005/0257692 A1   Nov. 24, 2005

(30) Foreign Application Priority Data

May 20, 2004   (IT)   ............... PD2004A0130

(51) Int. Cl.
*A21C 3/02*   (2006.01)
(52) U.S. Cl. ............... 425/363; 426/502; 426/517
(58) Field of Classification Search ............ 425/363, 425/367; 426/502, 517
See application file for complete search history.

(56) References Cited

U.S. PATENT DOCUMENTS

| | | | | |
|---|---|---|---|---|
| 2,125,859 | A * | 8/1938 | Liebelt | 425/367 |
| 3,883,283 | A * | 5/1975 | Herrera | 425/337 |
| 5,770,239 | A * | 6/1998 | Ancona | 425/190 |
| 5,919,493 | A * | 7/1999 | Sheppard et al. | 425/363 |
| 6,148,169 | A * | 11/2000 | Tsukamoto | 399/328 |
| 6,163,095 | A * | 12/2000 | Shams et al. | 310/104 |
| 2001/0028909 | A1* | 10/2001 | Kashulines, Jr. et al. | 426/512 |

* cited by examiner

*Primary Examiner*—Robert Davis
*Assistant Examiner*—Joseph Leyson
(74) *Attorney, Agent, or Firm*—Thomas S. Baker, Jr.

(57) ABSTRACT

This is a domestic rolling machine for homemade pasta with the surface of the rolling rollers formed by anodizing metal to provide a micro-rough surface that considerably increases adherence thus reducing the number of passes for the sheet of pasta to reduce the thickness of the sheet of pasta from the initial to the final thickness.

10 Claims, 3 Drawing Sheets

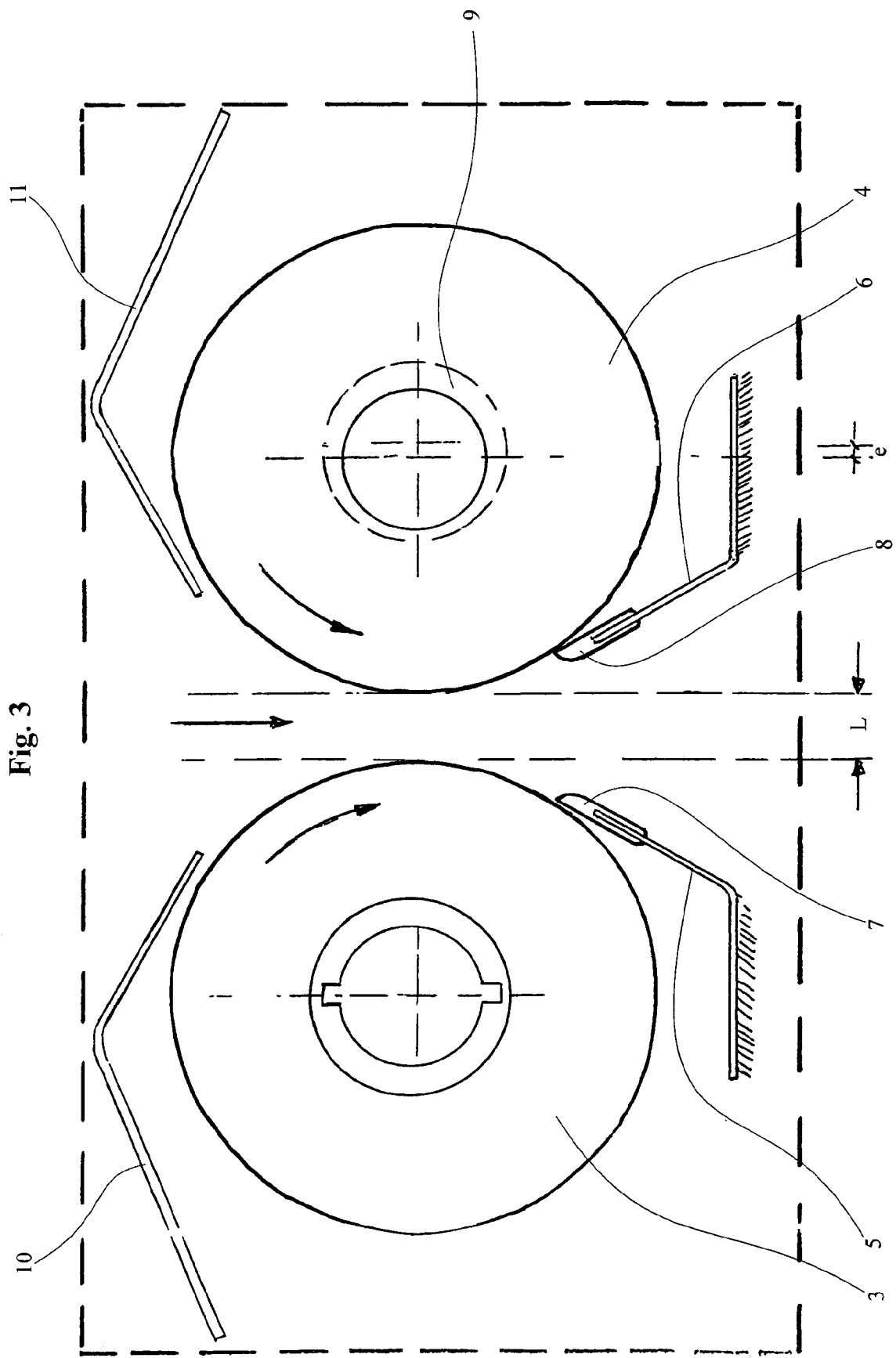

DOMESTIC PASTA MACHINE

CROSS-REFERENCES

None.

BACKGROUND OF THE INVENTION

We all know how homemade pasta is made.

The dough that is made from durum or bread wheat flour, eggs and water is prepared for processing with the domestic machines formed of a pair of smooth rollers and a pair of cutting rollers.

The longest rolling phase comes after the mixing phase.

After taking pieces of dough and patting them by hand into flat, thick and even sheets, they are introduced between the pair of smooth rollers in the domestic machine, with the maximum opening between the rollers.

To get the right thickness, the opening between the two rollers is reduced with each successive pass of the dough.

The reduction between one pass and the next to reduce the thickness of the pastry, is limited by the adherence of the roller surfaces which must drag the pasta sheet to press it.

Current domestic pasta machines which have been on the market for years now, have steel rolling rollers with a nickel-plated surface.

Nickel plating has a dual purpose, it protects the steel rollers and gives a longer lasting attractive appearance.

The problem with a nickel-plated surface is that it is smooth and compact and offers little adherence.

This means that numerous different passes are needed between the original thickness of the pasta sheet to the final required thickness.

This poor adherence is worsened further when dry flour has to be sprinkled over the pasta if it is too damp.

This means that the shiny nickel-plated surfaces offer no adherence whatever, and the pasta has to be pushed by hand into the two rollers.

The idea had been considered to roughen the nickel-plated surface to make it more adherent, by satinizing for example, but, as food products are involved, this is not possible because too much nickel would be given off into the pastry, which, being a heavy metal, is considered as harmful.

The aim of the patent is to overcome these problems by improving surface adherence of the rollers without any release of metal particles.

This aim has been reached by using aluminum rollers with anodized surfaces, exploiting the microporous feature of the surface which increases adherence and hardens the surface of the aluminum, which by nature is soft, and creates very long-lasting surfaces.

In fact the feature of this patent is the excellent surface adherence given by the microporous surface layer, in the form of evenly distributed microscopic raisings and grooves.

The anodizing process improves the microporosity without reducing the hardness and resistance to wear.

In detail, the surface layer of the anodized rollers is formed of a porous layer of aluminum oxide being in crystalline alumina ($Al_2O_3$) form and being an amorphous metal which is extremely hard and wear resistant with a microporous surface that creates micro-roughness without releasing any metal particles.

The inventiveness in this patent lies in using the collateral feature of anodizing aluminum which ensures hardness and resistance to wear and creates the surface micro-roughness which improves adherence of the rolling rollers on the pasta machines.

The hardness and wear resistance properties in this specific patent are also very advantageous, because the aluminum used for anodizing the rollers is of moderate hardness and is not easy to dent and the wear resistance of the surface reduces to virtually zero the release of particles from the surface layer, and even in the event any particles were released, being alumina they are not considered harmful in food preparations.

As previously stated, the anodized alumina used improves adherence on the surface of the processing rollers (rollers and cutters) in aluminum or aluminum alloys, but as alumina is by nature abrasive, it presents a problem for the scraping blades.

The function of the scraper blades is to avoid any pasta remaining on the rollers, and when the metal blades come into contact with the surface of the rollers they create friction.

As we said above, the surface of the rollers is abrasive and tends to wear the edges where the blades come into contact.

As the blades must be flexible to function, either stainless steel or nickel-plated steel are preferably used because they are hard wearing.

As we know, with wear the material begins to detach and this metal material would enter the pasta that is being processed.

Therefore as the surface of the rollers is alumina (hard and abrasive), the answer to avoid the metal particles detaching from the scraper blades is to coat them with a resin film for food use, to clean the rollers removing any pasta deposits and able to gently resist the roughness of the roller surface for a long time.

SUMMARY OF THE INVENTION

These two innovations, the first the anodized aluminum surface on the rollers and the second the scraping blades coated with a resin film for food use, revolutionize the long-lasting use of domestic pasta machines, with rollers with nickel-plated surfaces, improving adherence when making the pasta and reducing working time as the number of passes is reduced to reach the final thickness, with no risk of releasing metal particles from the blades that scrape the abrasive surface of the rollers.

Furthermore there is the advantage that as the surface of the rollers are covered with a layer of anodized alumina, no metal particles are released into the pasta, in particular heavy metals like nickel which is harmful in food use.

The above facts are clearly shown by the enclosed drawings.

DESCRIPTION OF THE DRAWINGS

FIG. 3 shows a simple and enlarged diagram of the top part of FIG. 1, which shows that the ends of the blades are angled and resting (preloaded) on the surface of the rollers and are coated.

Figure 1:
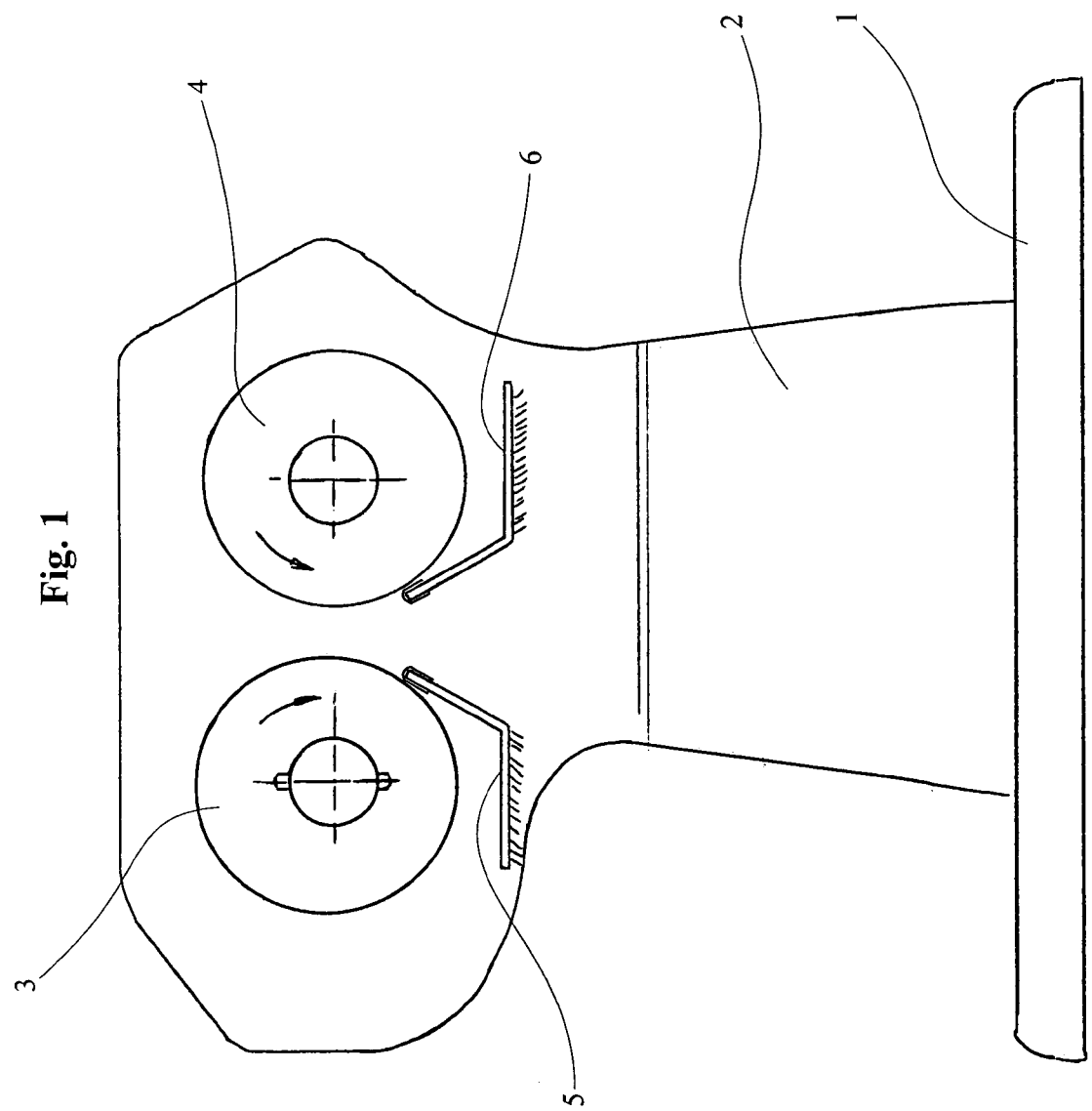
FIG. 1 shows a rough diagram of a domestic manual pasta machine with two cylindrical rollers for rolling the pasta with the scraper blades adhering to the rollers to remove any pasta that remains attached.

The figure shows how one roller is mounted on an eccentric shaft which allows adjusting the space between the rollers which is required for passing from the original thickness of the pasta sheet to the final thickness.

DESCRIPTION OF THE INVENTION

The figures give a rough diagram of how normal machines are formed of a base (1), two sides (2) which rise out of the base, the rollers (3), (4), the shafts of which are supported by the sides, the scraper blades (5), (6), coated in synthetic resin (7), (8).

The notched governor is not shown which controls the eccentric shaft (9) on roller (4) to adjust the opening L.

The diagrams show the shaped blades (10), (11) above the rollers which allow introducing the pasta sheet between rollers (3) and (4) for rolling.

Figure 2:
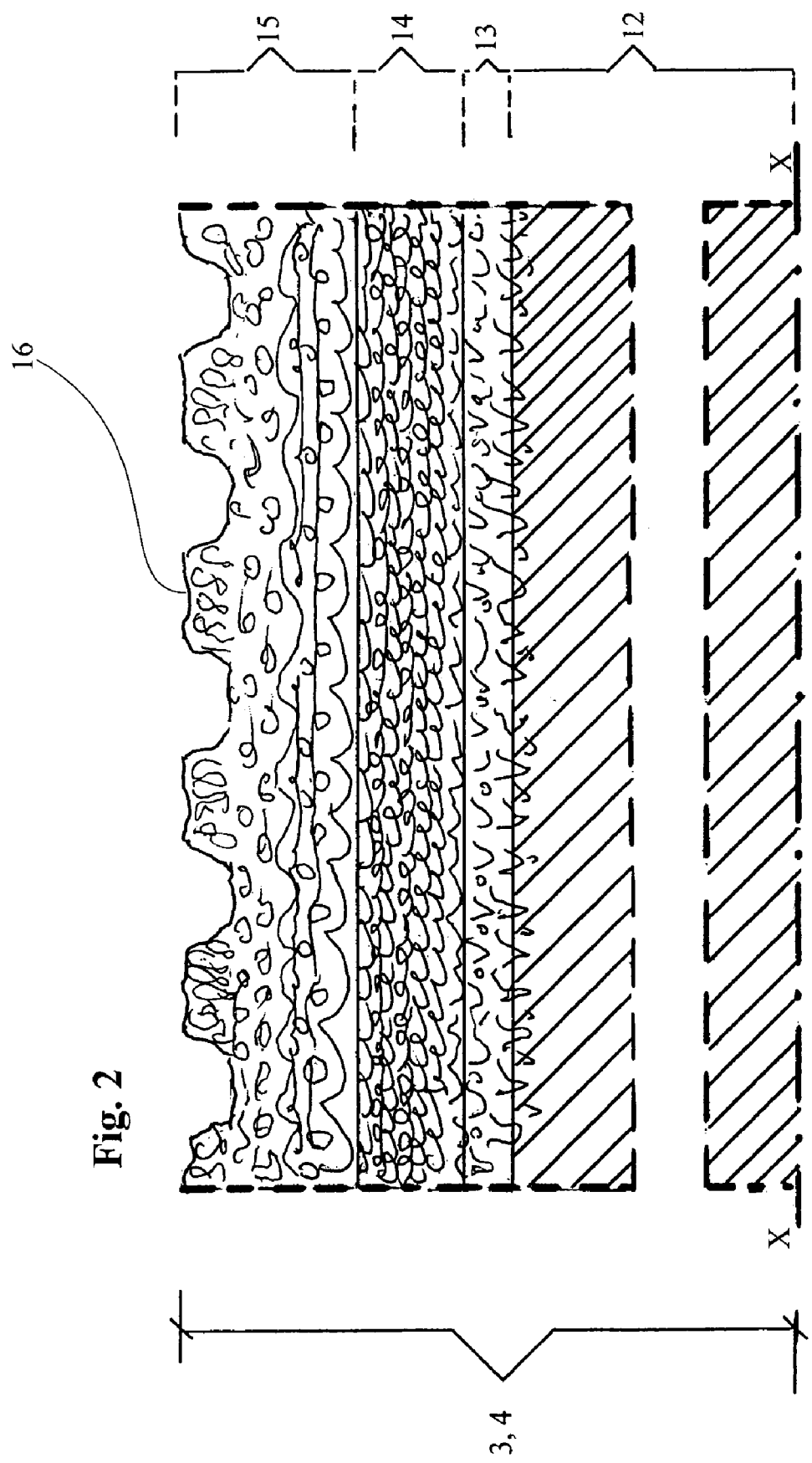
FIG. 2 shows a radial section of an aluminum (or aluminum alloy) roller with thick anodizing treatment, to highlight the different growing layers of alumina from the inside towards the surface.

On examining the radial section in FIG. 2, the central area (12) of rollers (4), (5), with the base metal being aluminum (or aluminum alloy), is shown by section lines as it is not involved in the anodizing treatment, while above the central area there are three layers of stratification, in detail, first layer (13) called barrier layer, which penetrates the base metal with decreasing diffusion and anchors the metal, a second fine transition layer (14) with an increased amount of compact alumina, a third layer (15) which grows in porosity to become extremely porous and uneven on the surface (16), creating micro-roughness and effective adherence. The third layer (15) is formed of aluminum oxide being in crystalline ($Al_2O_3$) form and being an amorphous metal.

From this exposition, even if in appearance the machine looks like the normal machines currently on sale, the innovation applied revolutionizes the production capacity by increasing surface adherence of the rollers, requiring less passes from an initial thick sheet of pasta to reach the final desired thickness; with the guarantee that the material used for forming the thickness on the surface of the rollers is for hardness and nature a material which, if any material is released into the processed pasta, does not create any undesired or harmful effects.

This patent also covers any possible improvements that experts in the field could construct, based on the teachings of this patent.

The invention claimed is:

1. A pasta machine which comprises;
   a base;
   a pair of spaced side walls affixed to said base;
   a pair of spaced shaft mounted, parallel rollers rotatably supported in said side walls;
   each of said rollers having roller surfaces; and
   wherein said roller surfaces are comprised of a porous layer of anodized metal which provides a micro-rough surface for said rollers.

2. The pasta machine of claim 1 wherein said rollers are formed from aluminum or aluminum alloy and said roller surfaces are formed from anodized aluminum.

3. The pasta machine of claim 1 wherein said anodized metal is aluminum oxide, in crystalline $Al_2O_3$ form and as amorphous material.

4. The pasta machine of claim 1 wherein said anodized rollers further comprise a first barrier which anchors to an anodizing metal, a second fine transition layer with an increased amount of compact anodized metal, and a third outer layer of porous anodized metal.

5. A pasta machine which comprises;
   a base;
   a pair of spaced side walls affixed to said base;
   a pair of spaced shaft mounted, parallel rollers rotatably supported in said side walls;
   each of said rollers having roller surfaces;
   wherein said roller surfaces are comprised of a porous layer of anodized metal which provides a micro-rough surface for said rollers;
   a pair of scraper blades mounted in close proximity to said rollers having roller contact end surfaces which engage said roller surfaces; and
   a coating of resin film for food use applied to said scraper blade roller contact end surfaces to prevent erosion of said scraper blade end surfaces.

6. The pasta machine of claim 5 wherein said rollers are formed from aluminum or aluminum alloy and said roller surfaces are formed from anodized aluminum.

7. The pasta machine of claim 5 wherein said anodized metal is aluminum oxide, in crystalline $Al_2O_3$ form and as amorphous material.

8. The pasta machine of claim 5 wherein said anodized rollers further comprise a first barrier which anchors to an anodizing metal, a second fine transition layer with an increased amount of compact anodized metal, and a third outer layer of porous anodized metal.

9. The pasta machine of claim 5 wherein said scraper blades are metal and flexible.

10. The pasta machine of claim 5 wherein said scraper blades are biased against said rollers.

* * * * *